US010975746B1

(12) United States Patent
Jeffrey et al.

(10) Patent No.: US 10,975,746 B1
(45) Date of Patent: Apr. 13, 2021

(54) VARYING CLOSED LOOP GAIN CONTROL TO CONSTRAIN RAMP RATE OF OXYGEN SENSORS IN EXHAUST SYSTEMS

(71) Applicant: GM GLOBAL TECHNOLOGY OPERATIONS LLC, Detroit, MI (US)

(72) Inventors: Scott R. Jeffrey, Hartland, MI (US); Rajeev M. Ramanan, Northville, MI (US); Jhansi Basani, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/711,637

(22) Filed: Dec. 12, 2019

(51) Int. Cl.
| | |
|---|---|
| *F01N 3/00* | (2006.01) |
| *F01N 3/18* | (2006.01) |
| *F01N 11/00* | (2006.01) |
| *F01N 9/00* | (2006.01) |
| *F02D 41/14* | (2006.01) |

(52) U.S. Cl.
CPC ............... *F01N 3/18* (2013.01); *F01N 9/00* (2013.01); *F01N 11/002* (2013.01); *F02D 41/1494* (2013.01); *F01N 2560/20* (2013.01)

(58) Field of Classification Search
CPC . F01N 3/18; F01N 11/002; F01N 9/00; F01N 2560/20; F02D 41/1494
See application file for complete search history.

(56) References Cited

U.S. PATENT DOCUMENTS

| | | | | |
|---|---|---|---|---|
| 5,855,113 | A * | 1/1999 | Cullen | F01N 3/0885 60/274 |
| 9,856,799 | B1 * | 1/2018 | McQuillen | F02D 41/0025 |
| 9,874,549 | B2 * | 1/2018 | Makled | F02D 19/0655 |
| 2003/0178016 | A1 * | 9/2003 | Nebiyeloul-Kifle | F02D 41/1496 123/676 |
| 2014/0156172 | A1 * | 6/2014 | Surnilla | F01N 11/00 701/104 |
| 2014/0343747 | A1 * | 11/2014 | Culbertson | F01N 3/2013 700/300 |
| 2017/0248061 | A1 * | 8/2017 | Martin | F02D 41/2474 |
| 2018/0348265 | A1 * | 12/2018 | Hopkins-Breitlow | F24D 11/0207 |

* cited by examiner

*Primary Examiner* — Matthew T Largi

(57) ABSTRACT

A driver circuit drives a heater associated with a sensor in an exhaust system of a vehicle at a duty cycle. A feedback circuit generates a feedback signal indicating a temperature of the sensor. A ramp circuit outputs a first ramping set point indicating a first rate at which the temperature of the sensor is to be changed over a first time period after an engine of the vehicle is turned on, and a second ramping set point indicating a second rate at which the temperature of the sensor is to be changed after the first time period until the temperature of the sensor reaches a predetermined temperature. An error circuit generates first and second error signals based on the feedback signal and the first and second ramping set points. A controller controls the duty cycle of the driver circuit to drive the heater based on one or more gains.

20 Claims, 2 Drawing Sheets

VARYING CLOSED LOOP GAIN CONTROL TO CONSTRAIN RAMP RATE OF OXYGEN SENSORS IN EXHAUST SYSTEMS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to exhaust systems of vehicles and more particularly to varying closed loop gain control to constrain ramp rate of oxygen sensors in the exhaust systems of vehicles.

An oxygen sensor (O2 sensor) is mounted in an exhaust manifold to sense unburned oxygen in exhaust gases exiting an engine of a vehicle. The number of oxygen sensors in an exhaust system varies. Many vehicles have two oxygen sensors: a first oxygen sensor located upstream relative to a catalytic converter and a second oxygen sensor located downstream relative to the catalytic converter. The first (upstream) oxygen sensor measures an air-fuel ratio of the exhaust coming out of the exhaust manifold and sends high and low voltage signals to a powertrain control module to regulate an air-fuel mixture. When the powertrain control module receives a low voltage signal indicating a lean air-fuel mixture, the powertrain control module compensates by increasing an amount of fuel in the air-fuel mixture. When the powertrain control module receives a high voltage signal indicating a rich air-fuel mixture, the powertrain control module leans the air-fuel mixture by reducing the amount of fuel in the air-fuel mixture. The powertrain control module's use of input from the oxygen sensor to regulate the air-fuel mixture is called closed loop feedback control. This closed loop operation results in an ongoing flip-flop between rich and lean, which allows the catalytic converter to minimize emissions by keeping an overall average ratio of the air-fuel mixture in proper balance.

However, when a cold engine is started, or if an oxygen sensor fails, the powertrain control module enters into open loop operation. In open loop operation, the powertrain control module does not receive a signal from the oxygen sensor and orders a fixed rich fuel mixture. Open loop operation results in increased fuel consumption and emissions. Many newer oxygen sensors include heating elements to help them reach the operating temperature quickly in order to minimize the amount of time spent in open loop operation.

The second (downstream) oxygen sensor measures the air-fuel ratio coming out of the catalytic converter to ensure the catalytic converter is functioning properly. The catalytic converter works to maintain a desired stoichiometric air-fuel ratio while the powertrain control module flip-flops between rich and lean air-fuel mixtures due to the input from the upstream oxygen sensor (sensor 1). Therefore, the downstream oxygen sensor (sensor 2) needs to produce a steady voltage.

Wideband Oxygen sensors (also called Wide Range Air Fuel or WRAF sensors) and Air/Fuel (A/F) sensors, are replacing conventional oxygen sensors in newer vehicles. A WRAF sensor is essentially a smarter oxygen sensor with some additional internal circuitry that allows it to precisely determine the exact air/fuel ratio of the engine. Like an ordinary oxygen sensor, it reacts to changing oxygen levels in the exhaust. But unlike an ordinary oxygen sensor, its output signal does not change abruptly when the air/fuel mixture goes rich or lean. While an ordinary oxygen sensor is a rich/lean indicator, the WRAF sensor provides a gradually changing signal that corresponds to the exact air/fuel ratio. The WRAF sensor's output voltage is converted by its internal circuitry into a variable bidirectional current signal that can gradually increase in a positive direction when the air/fuel mixture becomes leaner. At the "stoichiometric" point when the air/fuel mixture is perfectly balanced (14.7 to 1), the current flow from the WRAF sensor stops. When the air/fuel ratio becomes progressively richer, the current flows in a negative direction. Like ordinary oxygen sensors, WRAF sensors also have an internal heater circuit to help them reach operating temperature quickly. To work properly, WRAF sensors typically require a higher operating temperature than oxygen sensors.

SUMMARY

A system comprises a driver circuit, a feedback circuit, a ramp circuit, an error circuit, and a controller. The driver circuit is configured to drive a heater associated with a sensor in an exhaust system of a vehicle at a duty cycle. The feedback circuit is configured to generate a feedback signal indicating a temperature of the sensor. The ramp circuit is configured to output a first ramping set point indicating a first rate at which the temperature of the sensor is to be changed over a first time period after an engine of the vehicle is turned on. The ramp circuit is configured to output a second ramping set point indicating a second rate at which the temperature of the sensor is to be changed after the first time period until the temperature of the sensor reaches a predetermined temperature. The error circuit is configured to generate a first error signal based on the feedback signal and the first ramping set point during the first time period. The error circuit is configured to generate a second error signal based on the feedback signal and the second ramping set point after the first time period until the temperature of the sensor reaches the predetermined temperature. The controller is configured to control the duty cycle of the driver circuit to drive the heater based on one or more gains. The controller is configured to adjust the one or more gains based on the first error signal during the first time period. The controller is configured to adjust the one or more gains based on the second error signal after the first time period until the temperature of the sensor reaches the predetermined temperature.

In another feature, the controller adjusts the duty cycle of the driver circuit to drive the heater based on the adjusted one or more gains.

In another feature, the second rate is faster than the first rate.

In another feature, the predetermined temperature is a light off temperature of the sensor.

In another feature, the temperature of the sensor remains within limits specified by a manufacturer of the sensor due to the adjusted one or more gains.

In another feature, the sensor heats to a first temperature that is less than the predetermined temperature at an end of the first time period.

In another feature, the sensor heats during the first time period in presence of water vapor.

In another feature, the sensor heats during the first time period without being damaged.

In another feature, the sensor reaches the predetermined temperature without being damaged.

In other features, the driver circuit includes a pulse width modulation circuit, and the controller includes a proportional integral derivative controller.

In still other features, a method comprising driving a heater associated with a sensor in an exhaust system of a vehicle at a duty cycle, and receiving a feedback signal indicating a temperature of the sensor. The method further comprises outputting a first ramping set point indicating a first rate at which the temperature of the sensor is to be changed over a first time period after an engine of the vehicle is turned on. The method further comprises outputting a second ramping set point indicating a second rate at which the temperature of the sensor is to be changed after the first time period until the temperature of the sensor reaches a predetermined temperature. The method further comprises generating a first error signal based on the feedback signal and the first ramping set point during the first time period. The method further comprises generating a second error signal based on the feedback signal and the second ramping set point after the first time period until the temperature of the sensor reaches the predetermined temperature. The method further comprises controlling the duty cycle to drive the heater based on one or more gains, adjusting the one or more gains based on the first error signal during the first time period, and adjusting the one or more gains based on the second error signal after the first time period until the temperature of the sensor reaches the predetermined temperature.

In another feature, the method further comprises adjusting the duty cycle to drive the heater based on the adjusted one or more gains.

In another feature, the second rate is faster than the first rate.

In another feature, the predetermined temperature is a light off temperature of the sensor.

In another feature, the method further comprises maintaining the temperature of the sensor within limits specified by a manufacturer of the sensor due to the adjusted one or more gains.

In another feature, the method further comprises heating the sensor heats to a first temperature that is less than the predetermined temperature at an end of the first time period.

In another feature, the method further comprises heating the sensor during the first time period in presence of water vapor.

In another feature, the method further comprises heating the sensor during the first time period without damaging the sensor.

In another feature, the method further comprises heating the sensor to the predetermined temperature without damaging the sensor.

In another feature, the method further comprises controlling the duty cycle to drive the heater using pulse width modulation, and using a proportional integral derivative controller.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
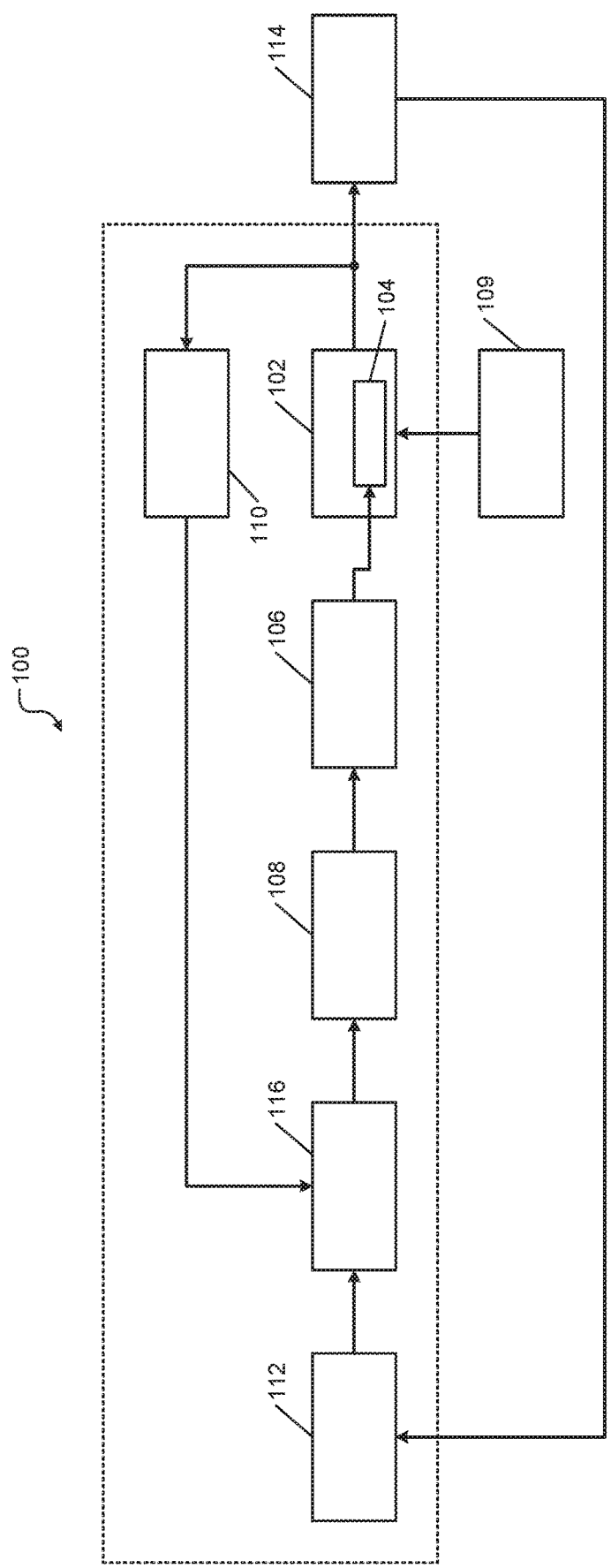
FIG. 1 shows a system for controlling heating of a sensor (e.g., an oxygen or a wide-range air-fuel sensor) in an exhaust system of a vehicle according to the present disclosure.

O2 and WRAF sensors need to have a constrained temperature increase rate to prevent the sensor from breaking. The proposed method changes the gains of the heater control to constrain the temperature increase rate to a maximum rate recommended by sensor manufacturer. The calibrated gains of the O2 sensor heater control are automatically constrained using closed loop feedback during warm up period of the sensor. No additional gain calibration required for the warm up period, and the method uses sensor feedback to ensure that the constraint is not violated. In addition to preventing breakage, the method decreases the O2 and WRAF sensor light off time for better emissions, where light off time is time taken by the sensor to reach a light off temperature, which is a temperature at which the sensor is sufficiently warm and usable.

To decrease the light off time, many newer sensors have lower mass and use higher heater power, which increases the thermal ramp rate of the sensors, which in turn can cause sensor breakage. Presently, the controls use an open loop minimum voltage level that is supplied to the sensor during the warmup period. Present controls do not use any feedback from the sensor and do not control heater gains during the warmup period of the sensor. The system and method of the present disclosure use the feedback and control the heater gains to optimize the maximum ramp rate specified by the supplier, which results in a more robust heater control that prevents sensor failure and also minimizes the warmup time and emissions. Specifically, the system and method use feedback of the sensor temperature measurement to change the gains of the closed loop control in order to constrain the temperature ramp rate to the maximum value specified by the supplier.

For either sensor (i.e., O2 or WRAF), the output of the sensor is a function of the temperature of the sensor. Heaters are used to heat these sensors to control the sensor temperature and consequently to control the sensor output to a desired value. The proposed system accomplishes this goal in a manner that also prevents the sensors from cracking due to heating during the warmup period until light off is reached, as explained below in detail.

When the engine is cold started, the engine exhaust often contains water vapor. This water vapor can break (e.g., crack) the sensors if the temperature of the sensor is not controller properly. To prevent breakage, some manufacturers specify not heating the sensor for a time period after the engine is cold started. The assumption is that the water vapor will no longer be present after the time period. After the time period has elapsed, the sensor can be heated according to a specified heating profile or temperature profile until the sensor is heated to a desired temperature at which the sensor is ready for use (i.e., light off temperature). However, this process can take a long time, which can adversely affect fuel efficiency and emissions.

Some manufacturers allow heating the sensor in a controlled manner after the engine is cold started. These manufacturers typically provide different heating modes and corresponding heating profiles for gradually heating their sensors. For example, in a first mode, which covers the heating of the sensor for a first predetermined time period immediately after the engine is cold started, the sensor is heated at a first rate according to a first profile. That is, after the engine is cold started, the sensor temperature is increased at the first rate according to the first profile for the first predetermined time period. The water vapor is assumed (or verified) to be no longer present at the end of the first predetermined time period.

After the first predetermined time period, in a second mode, the sensor is heated at a second rate according to a second profile until the sensor temperature reaches the light off temperature. That is, after the first predetermined time period, the sensor temperature is increased at the second rate according to the second profile until the sensor temperature reaches the light off temperature. Some manufactures provide additional modes and specify different heating rates and corresponding profiles for each additional mode. Both the first and second rates need not be linear (i.e., the rates can be nonlinear). The second rate may be faster than the first rate. Importantly, the manufactures constrain (i.e., limit) these rates to prevent sensor breakage. That is, the manufacturers specify maximum and minimum values for these rates in each mode. The system and method of the present disclosure control the heater that heats the sensor such that the sensor temperature is varied according to the manufacturer's profile and within the manufacturer's constraints in each mode, independently of the type and manufacturer of the sensor.

FIG. 1 shows a system 100 for controlling heating of a sensor according to the present disclosure. While only one sensor is shown and described for illustrative purposes, the system 100 can control a plurality of sensors in the manner described below. While shown separately, one or more of the elements 106, 108, 110, 112, and 116 can be integrated into a single circuit.

The system 100 comprises a sensor 102 (e.g., an O2 or WRAF sensor) with an associated heater 104, a driver circuit (e.g., a PWM circuit) 106 that drives the heater 104 at a duty cycle, and a controller (e.g., a PID controller) 108 that controls the duty cycle of the heater 104 according to one or more gains. A battery 109 of the vehicle supplies power to the sensor 102.

The system 100 further comprises a feedback circuit 110 that senses a resistance of the sensor 102, which varies as a function of the temperature of the sensor 102. The feedback circuit 110 converts the resistance into a temperature measurement using a lookup table and generates a feedback signal indicating the temperature of the sensor 102.

The system 100 further comprises a ramp circuit 112. The ramp circuit 112 generates a ramping (i.e., varying with time in the form of a ramp) set point for the sensor 102. For example, the ramp circuit 112 may generate a first ramping set point that varies at a first rate during a first time period after the engine is turned on (i.e., cold started). After the first time period, the ramping circuit 112 may generate a second ramping set point that varies at a second rate until the sensor temperature reaches a predetermined temperature (e.g., a light off temperature). The second rate can be faster than the first rate. The units of the ramping set points can be degrees Celsius per second.

An engine control module 114 controls the operation of the engine (e.g., air-to-fuel ratio) based on the output of the sensor 102. The engine control module 114 may store heating profiles for various sensors. The engine control module 114 may sense the type of the sensor 102 and provide to the ramp circuit 112 the heating profile or profiles (depending on the number of heating modes) for the sensor 102. The ramp circuit 112 generates the ramping set points according to the heating profile or profiles. The ramp circuit 112 generates the ramping set points that are within the constraints specified by the heating profile or profiles.

The system 100 further comprises an error circuit 116 that compares the feedback signal to the ramping set points output by the ramp circuit 112 and generates error signals based on the comparisons. For example, during the first time period after the engine is turned on (i.e., cold started), the error circuit 116 generates a first error signal based on the feedback signal and the first ramping set point. The controller 108 adjusts its gains based on the first error signal and adjusts the duty cycle of the driver circuit 106 based on the adjusted gains. Since the first ramping set point varies during the first time period, the first error signal, the gains of the controller 108, and the duty cycle of the driver circuit 106 also vary during the first time period.

The driver circuit 106 drives the heater 104 at the adjusted duty cycle until the first time period expires. Since the ramp circuit 112 generates the ramping set points that are within the constraints specified by the heating profile or profiles, the adjusted duty cycle with which the driver circuit 106 drives the heater 104 ensures that the sensor temperature stays within limits specified by the heating profile or profiles so that the sensor does not crack.

The engine control module 114 may monitor the first time period using a counter. The engine control module 114 may determine the value of the counter based on the amount of time it takes for the water vapor in the exhaust system to disappear after the engine is cold started. The engine control module 114 may estimate the amount of time it takes for the water vapor to disappear based on factors such as ambient temperature, humidity, engine temperature, the amount of time elapsed since last engine turn-off, and so on.

Thus, at the end of the first time period, the sensor 102 warms up to a temperature that is less than the light off temperature without cracking or being otherwise damaged due to the controlled heating performed in the presence of water vapor as described above. The system 100 may utilize additional ramping set points during the first time period.

After the first time period expires, the ramping circuit 112 generates the second ramping set point that varies at the second rate until the sensor temperature reaches a predetermined temperature (e.g., a light off temperature). The error circuit 116 generates a second error signal based on the feedback signal and the second ramping set point. The controller 108 adjusts its gains based on the second error signal and adjusts the duty cycle of the driver circuit 106 based on the adjusted gains. Since the second ramping set point also varies with time, the second error signal, the gains of the controller 108, and the duty cycle of the driver circuit 106 also vary with time. The driver circuit 106 drives the heater 104 at the adjusted duty cycle until the sensor temperature reaches a predetermined temperature (e.g., a light off temperature of the sensor 102).

Thus, the sensor 102 heats up to the light off temperature without cracking or being otherwise damaged. Since the sensor 102 is already warmed up at the end of the first time period, the second rate at which the second ramping set point varies can be faster than the first rate at which the first ramping set point varies during the first time period. Thus, the sensor 102 reaches the light off temperature quickly and without cracking or being otherwise damaged. The system 100 may utilize additional ramping set points after the first time period.

The system 100 can determine whether the sensor 102 has reached a predetermined temperature (e.g., a light off temperature) in many ways. For example, the engine control module 114 may make the determination based on the output of the sensor 102. Alternatively, the error circuit 116 can make the determination based on the feedback signal.

Figure 2:
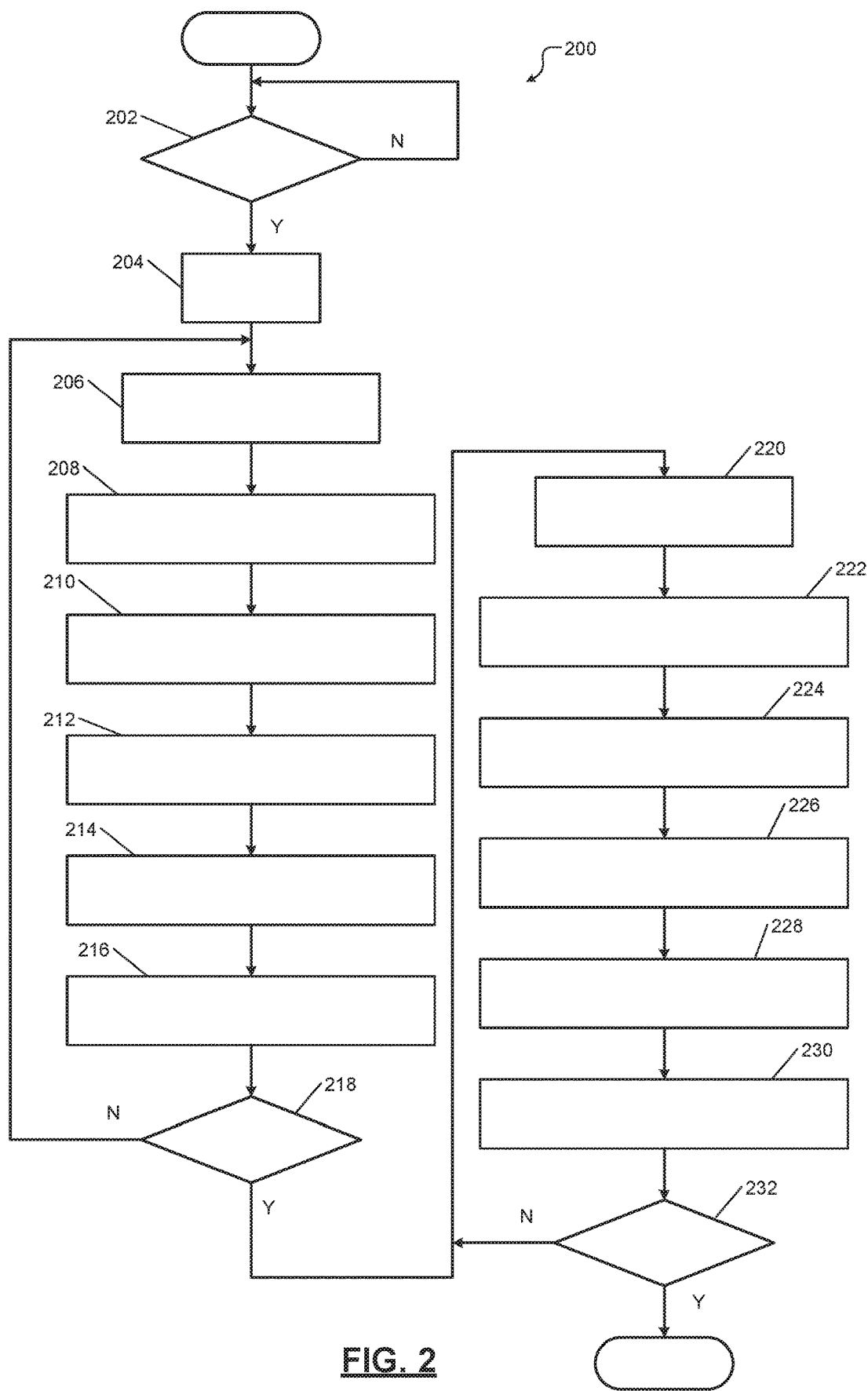
FIG. 2 shows a method for controlling heating of a sensor (e.g., an oxygen or a wide-range air-fuel sensor) in an exhaust system of a vehicle according to the present disclosure.

FIG. 2 shows a method 200 for controlling heating of a sensor according to the present disclosure. For example, the method 200 is performed by one of more elements (e.g., by one or more of the elements 106, 108, 110, 112, and 116) of the system 100. While only one sensor is described for illustrative purposes, the method 200 can control a plurality of sensors in the manner described below.

At 202, the method 200 determines whether the engine is turned on (i.e., cold started). The method 200 waits until the engine is turned on. The method 200 proceeds to 204 when the engine is turned on. At 204, the method 200 starts a counter. A first time period elapses when the counter expires. For example, the method 200 selects the first time period (i.e., the value of the counter) such that water vapor will not be present in the exhaust at the end of the first time (i.e., when the counter expires).

At 206, the method 200 outputs a first ramping set point for controlling a heater associated with the sensor. At 208, the method 200 generates feedback regarding a temperature of the sensor based on a resistance of the sensor. At 210, the method 200 generates a first error signal based on the feedback and the first ramping set point. At 212, the method 200 varies one or more gains of a controller that controls the heater based on the first error signal. The adjusted gains ensure that the sensor temperature remains within the specified limits. At 214, the method 200 controls a duty cycle of the heater based on the adjusted gains of the controller. At 216, the method 200 controls the heater based on the duty cycle generated based on the adjusted gains.

At 218, the method 200 determines whether the counter has expired. The method 200 returns to 206 if the counter has not yet expired. The method 200 proceeds to 220 if the counter has expired.

At 220, the method 200 outputs a second ramping set point for controlling the heater associated with the sensor. At 222, the method 200 continues to generate feedback regarding the temperature of the sensor based on the resistance of the sensor. At 224, the method 200 generates a second error signal based on the feedback and the second ramping set point. At 226, the method 200 varies one or more gains of the controller that controls the heater based on the second error signal. The adjusted gains ensure that the sensor temperature remains within the specified limits. At 228, the method 200 controls the duty cycle of the heater based on the adjusted gains of the controller. At 230, the method 200 controls the heater based on the duty cycle generated based on the adjusted gains.

At 232, the method 200 determines whether the sensor is heated to a predetermined temperature (e.g., the light off temperature of the sensor). The method 200 returns to 220 if the sensor is not yet heated to the predetermined temperature (e.g., the light off temperature of the sensor). The method 200 ends if the sensor is heated to the predetermined temperature (e.g., the light off temperature of the sensor).

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip (SoC).

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
   a driver circuit configured to drive a heater associated with a sensor in an exhaust system of a vehicle at a duty cycle;
   a feedback circuit configured to generate a feedback signal indicating a temperature of the sensor;
   a ramp circuit configured to output:
      a first ramping set point indicating a first rate at which the temperature of the sensor is to be changed over a first time period after an engine of the vehicle is turned on; and
      a second ramping set point indicating a second rate at which the temperature of the sensor is to be changed after the first time period until the temperature of the sensor reaches a predetermined temperature;
   an error circuit configured to:
      generate a first error signal based on the feedback signal and the first ramping set point during the first time period; and
      generate a second error signal based on the feedback signal and the second ramping set point after the first time period until the temperature of the sensor reaches the predetermined temperature; and
   a controller configured to:
      control the duty cycle of the driver circuit to drive the heater based on one or more gains;
      adjust the one or more gains based on the first error signal during the first time period; and
      adjust the one or more gains based on the second error signal after the first time period until the temperature of the sensor reaches the predetermined temperature.

2. The system of claim 1 wherein the controller adjusts the duty cycle of the driver circuit to drive the heater based on the adjusted one or more gains.

3. The system of claim 1 wherein the second rate is faster than the first rate.

4. The system of claim 1 wherein the predetermined temperature is a light off temperature of the sensor.

5. The system of claim 1 wherein the temperature of the sensor remains within limits specified by a manufacturer of the sensor due to the adjusted one or more gains.

6. The system of claim 1 wherein the sensor heats to a first temperature that is less than the predetermined temperature at an end of the first time period.

7. The system of claim 1 wherein the sensor heats during the first time period in presence of water vapor.

8. The system of claim 1 wherein the sensor heats during the first time period without being damaged.

9. The system of claim 1 wherein the sensor reaches the predetermined temperature without being damaged.

10. The system of claim 1 wherein the driver circuit includes a pulse width modulation circuit and wherein the controller includes a proportional integral derivative controller.

11. A method comprising:
   driving a heater associated with a sensor in an exhaust system of a vehicle at a duty cycle;
   receiving a feedback signal indicating a temperature of the sensor;
   outputting a first ramping set point indicating a first rate at which the temperature of the sensor is to be changed over a first time period after an engine of the vehicle is turned on;

outputting a second ramping set point indicating a second rate at which the temperature of the sensor is to be changed after the first time period until the temperature of the sensor reaches a predetermined temperature;

generating a first error signal based on the feedback signal and the first ramping set point during the first time period; and generating a second error signal based on the feedback signal and the second ramping set point after the first time period until the temperature of the sensor reaches the predetermined temperature; and controlling the duty cycle to drive the heater based on one or more gains;

adjusting the one or more gains based on the first error signal during the first time period; and adjusting the one or more gains based on the second error signal after the first time period until the temperature of the sensor reaches the predetermined temperature.

12. The method of claim 11 further comprising adjusting the duty cycle to drive the heater based on the adjusted one or more gains.

13. The method of claim 11 wherein the second rate is faster than the first rate.

14. The method of claim 11 wherein the predetermined temperature is a light off temperature of the sensor.

15. The method of claim 11 further comprising maintaining the temperature of the sensor within limits specified by a manufacturer of the sensor due to the adjusted one or more gains.

16. The method of claim 11 further comprising heating the sensor heats to a first temperature that is less than the predetermined temperature at an end of the first time period.

17. The method of claim 11 further comprising heating the sensor during the first time period in presence of water vapor.

18. The method of claim 11 further comprising heating the sensor during the first time period without damaging the sensor.

19. The method of claim 11 further comprising heating the sensor to the predetermined temperature without damaging the sensor.

20. The method of claim 11 further comprising controlling the duty cycle to drive the heater using pulse width modulation and using a proportional integral derivative controller.

* * * * *